Feb. 19, 1963
E. M. FOSTER
3,077,994
VEHICLE PARKING APPARATUS
Filed Aug. 5, 1960
3 Sheets-Sheet 3
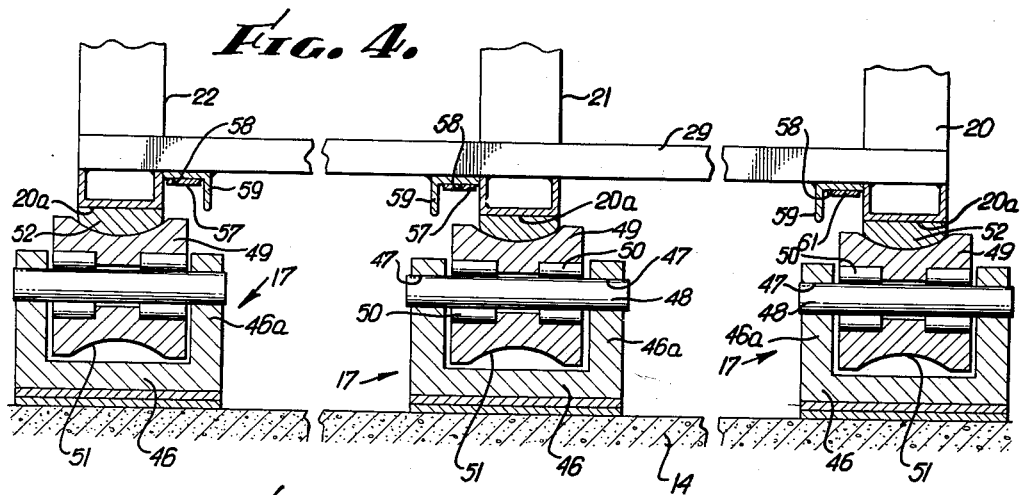
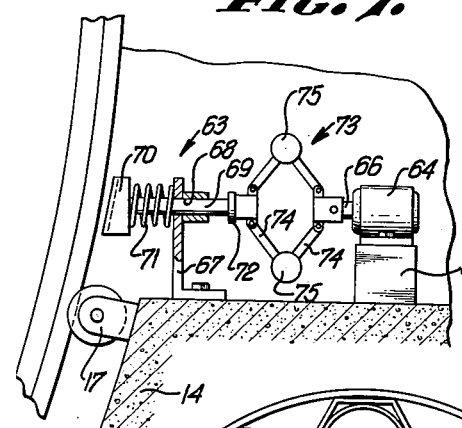
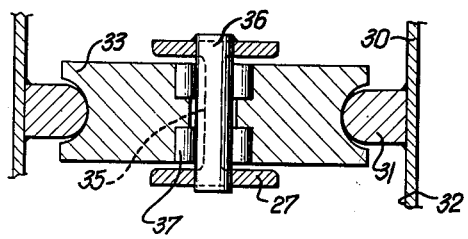
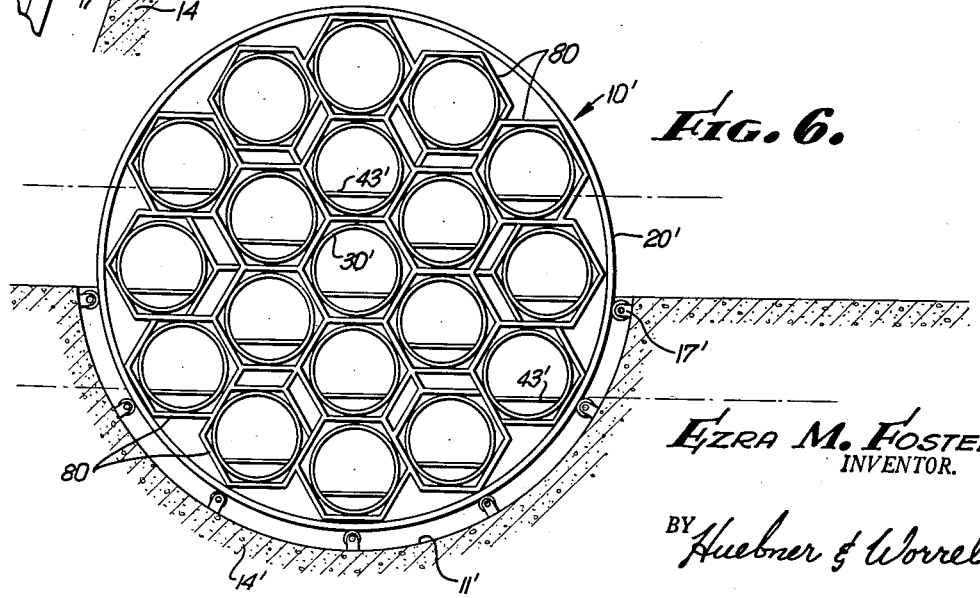
EZRA M. FOSTER
INVENTOR.
BY Huebner & Worrel
ATTORNEYS.

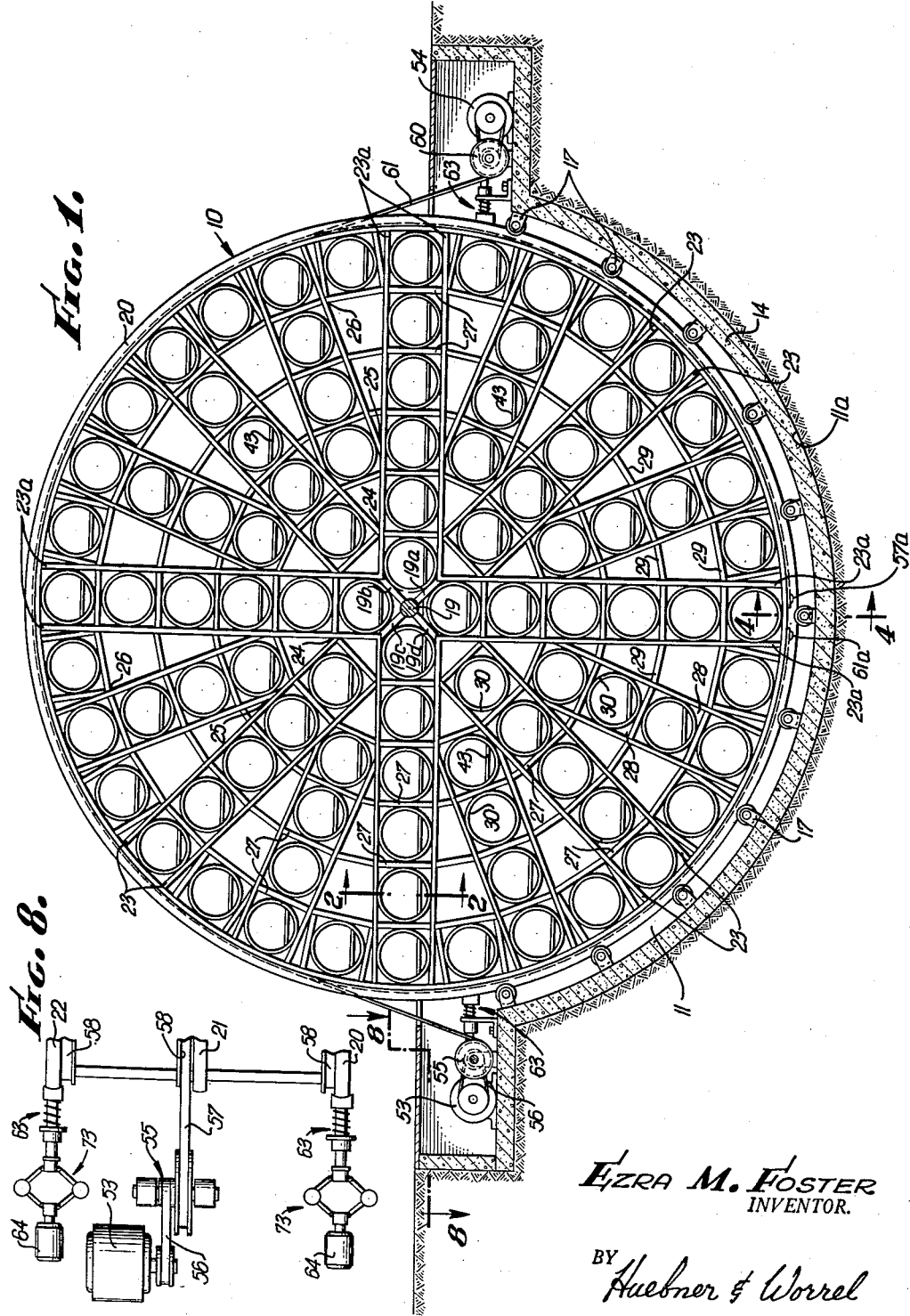

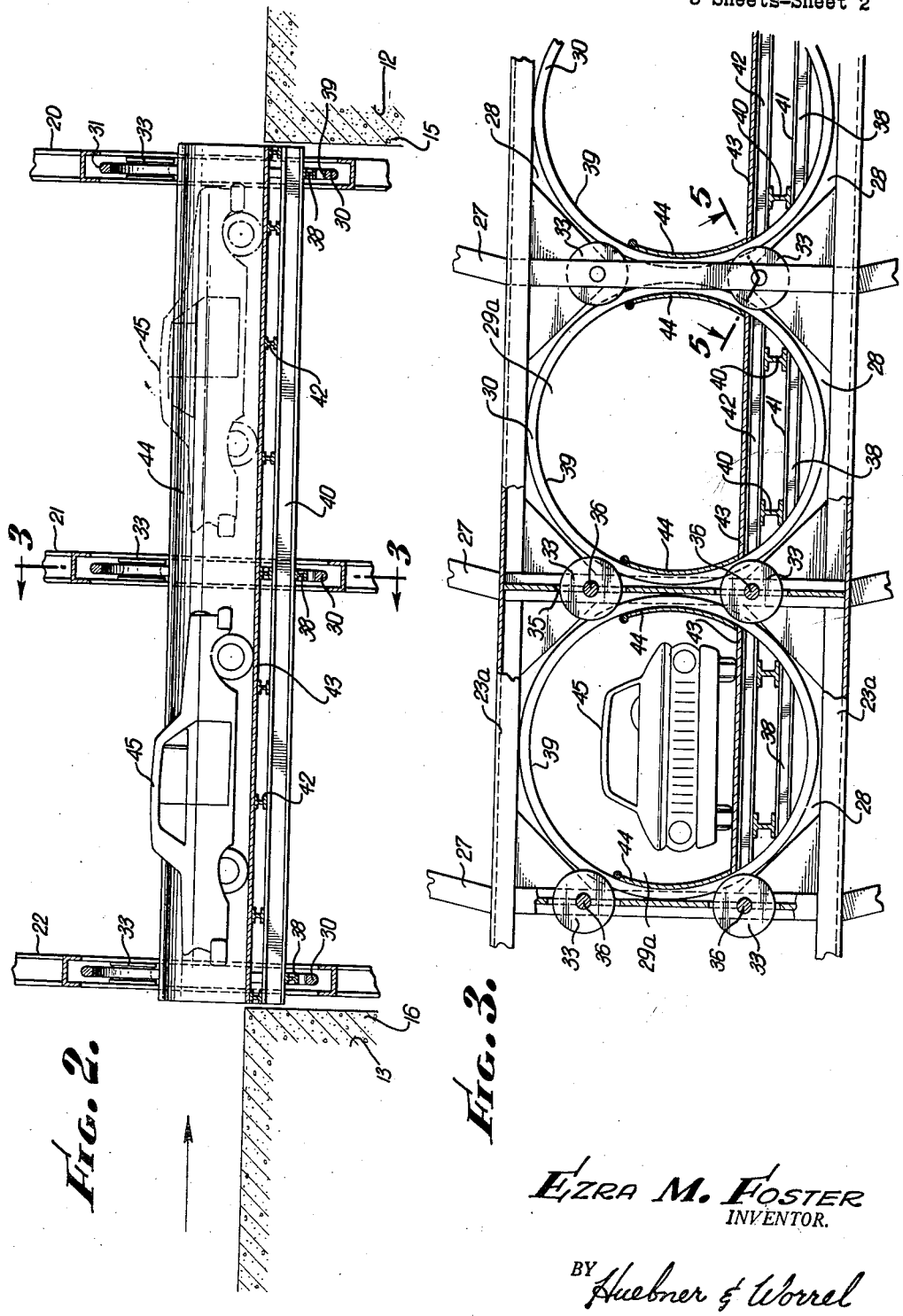

United States Patent Office 3,077,994
Patented Feb. 19, 1963

3,077,994
VEHICLE PARKING APPARATUS
Ezra M. Foster, Tarzana, Calif., assignor of three percent to Robert O. Lane, nine percent to Russell A. Byrd, and nine percent to Edwin W. Wilson, all of Bakersfield, Calif.; six percent to Edward A. Feser, San Gabriel, Calif., three percent to Mary T. Brown, Los Angeles, Calif., and seventy percent to Ezra M. Foster and Alice E. Foster, Tarzana, Calif., as joint tenants
Filed Aug. 5, 1960, Ser. No. 47,652
2 Claims. (Cl. 214—16.1)

This invention relates to a vehicle parking apparatus and more particularly to an apparatus that stores vehicles in suspension.

Due to the increased population of our cities and the increased number of cars or vehicles the parking of such vehicles in a metropolitan area has become a real problem. Many methods have been tried but in all cases a great amount of real estate is necessary for these various procedures. Thus the cost factor of any parking plan or device is increased to an uneconomical point.

One of the principal objects of my invention is to provide a vehicle parking apparatus requiring a small amount of ground surface area for its operation.

Another object of my invention is to provide a vehicle parking apparatus of unlimited capacity depending upon the area of the ground to be utilized and geographical condition of the earth, such as the water level in the ground and the earth structure.

A still further object of my invention is to provide a vehicle parking apparatus having convenient ingress and egress of vehicles.

Another object of my invention is to provide a vehicle parking apparatus of a suspension type which prevents unauthorized persons from access to a vehicle while in storage.

Another object of my invention is to provide a vehicle parking apparatus which is easy to operate, and which may be operated either manually by an attendant or automatically by the vehicle owner.

A still further object of my invention is to provide a vehicle parking apparatus that is economical to manufacture, simple in construction and relatively easy to install.

A more specific object is to provide a wheel type of parking apparatus rotatably mounted on rollers and having a plurality of vehicle parking sections including platforms within the wheel which are individually freely rotatable and have centers of gravity low enough that the platforms of the parking sections will remain horizontal at all times no matter where the vehicle parking sections are located within the wheel.

These and other objects will be apparent to those skilled in the art.

My invention consists of the construction, arrangements and combination of various parts of the device wherein the objects contemplated are attained as hereinafter more fully set forth, specifically pointed out in the claims and illustrated in the accompanying drawings, in which:

FIGURE 1 is a side elevational view of my parking apparatus as installed;

FIGURE 2 is a view taken on line 2—2 of FIGURE 1 showing in detail one of the vehicle storage sections of the apparatus;

FIGURE 3 is a view taken on line 3—3 of FIGURE 2 showing the details of construction of several vehicle storage sections and the rollers employed upon which the sections are mounted;

FIGURE 4 is a view taken on line 4—4 of FIGURE 1 showing in sectional detail the rollers upon which a vehicle storage wheel assembly revolves;

FIGURE 5 is a view taken on line 5—5 of FIGURE 3 showing the sectional details of one of the rollers upon which the vehicle storage sections revolve within the wheel;

FIGURE 6 is a modified form of my parking apparatus;

FIGURE 7 is a detail sectional view of a brake safety feature of my apparatus;

FIGURE 8 is top plan view taken on line 8—8 of FIGURE 1 showing in detail the construction of one driving means and one set of brakes for my parking apparatus.

The device generally consists of a wheel assembly 10 which is rotatably mounted in an earth cavity 11. The cavity has a curved bottom surface 11a and generally parallel spaced apart side walls 12 and 13. The cavity 11 is paved on its bottom surface with a concrete floor 14 and the side walls 12 and 13 of the cavity 11 are paved with concrete forming parallel sides 15 and 16. The wheel assembly 10 rests upon roller means 17 which are mounted at spaced intervals along the bottom surface 14.

The wheel assembly 10 is constructed of a front ring 20, middle ring 21 and back ring 22, which are aligned in tandem arrangement, that is one behind the other and spaced one from the other as best seen in FIGURE 2. The rings each have an outer generally flat periphery 20a.

At the central axis of the respective rings 20, 21, and 22 there is positioned a stub axle 19, which has mounted to it four radially extending spokes 19a, b, c and d, for each ring. These spokes 19a, b, c and d join pairs of generally parallel I beam radii spoke supports 23a which extend radially outwardly and are secured to the respective rings 20, 21, 22. The pairs of supports 23a on each side of the axle 19 are arranged so that they are diametrically aligned within each ring 20, 21 and 22 and divide the rings into four quadrants. Other pairs of I beam supports 23 begin outwardly of the axle 19 as at 24, 25, and 26 within each quadrant and extend radially to the rings between the pairs of supports 23a.

There is further provided I beam supports 27 between each of the respective spoke supports 23a and 23 and connected thereto which are spaced inwardly from the respective rings forming rectangular openings 28 within the pairs 23a and 23. The respective pairs 23a and 23 are further joined to each other by means of I beam braces 29 which are spaced from each other inwardly of the respective rings.

Each of the rectangular openings 28 receive vehicle parking sections generally designated 29a. The respective sections 29a comprise rotatably mounted vehicle rings 30, as best seen in FIGURE 3, within the openings 28. The rings 30 have on the exterior periphery 32 tracks 31 convex shaped in cross section, best illustrated in FIGURE 5, which engages rollers 33 mounted on the supports 27. The rollers 33 are provided with grooves which are complementary with the track 31 of the vehicle rings 30. The rollers 33 are mounted on the I beam supports 27 on shafts 36 within cut-out portions 35. The rollers are each provided with bearings 37 which journal on shaft 36. With the mounting of the respective vehicle rings 30 on the rollers 33 the rings 30 are freely rotatable.

Each of the respective rings 30 are fitted with I beam vehicle supports 38, as best seen in FIGURE 3, which are mounted to the inner surface 39 of the rings 30 forming a secant across spaced points on the inner surface 39. A pair of longitudinal I beam ring spacer supports 40 are secured as by welding or otherwise to the top portion 41 of the supports 38 and extend from the front ring 20 through the middle ring 21 and to the back ring 22. These spacer supports 40 serve to maintain the rings 20, 21 and 22 in spaced relation from each other and also serve as supporting members for a plurality of platform I beam cross-members 42 which extend parallel to supports 38. These platform cross-members 42 are spaced along the entire length of the support members 40 as best illustrated in FIGURE 2. Vehicle platforms 43 of sheet metal or any other material of a sufficient strength to hold a vehicle extend longitudinally through the respective rings 20, 21, 22 and are secured to the cross members 42 by welding or other suitable means. Generally the platforms 43 extend out through the rings 21 and 22 to a point adjacent the respective sides 15 and 16, so that when the platforms are at ground level the gap is not wide enough to damage vehicle tires as the vehicle drives on or off of the platforms 43. At each side of the respective platforms 43 safety fences 44 are provided which extend upward to a point approximately the height of a vehicle when resting on a platform 43. It should be noted that the platforms 43 are further provided with safety gates, not shown, adjacent the ends of the platforms to prevent a vehicle from rolling off a platform. These fences 44 are curved and generally made of aluminum mesh or other suitable material. The fences 44 each extend the entire length of the platform 43 and give greater safety to the use of the parking apparatus and will prevent a person falling from the platform 43 when getting in and out of a vehicle.

The spacing between the rings 20 and 21, and 21 and 22 should be sufficient to allow the parking of two vehicles 45, in end to end relationsip upon each respective platform.

In order for the parking wheel assembly 10 to rotatably move about its central axis the roller assemblies 17 are provided. Each assembly comprises a U shaped roller holder 46 secured to the bottom 14 and having aligned openings 47 in each arm 46a to receive a shaft 48 which extends through the openings 47 and a roller 49. Bearings 50 are provided in each roller 49 to journal on the saft 48. It should be noted that the respective rollers 49, as best illustrated in FIGURE 4, have grooved surfaces 51 which are adapted to receive complementary annular tracks 52 which are formed by weldments on the outer periphery of the respective rings 20, 21 and 22. By having the respective roller assemblies 17 spaced along the bottom 14 the wheel assembly 10 will rest upon the rollers and be freely rotatable about its central axis. It should be noted that the wheel assembly 10 is positioned in the earth cavity 11 so that the axis of the assembly is at ground level, as best seen in FIGURE 1.

In order to rotate the parking wheel 10 so that the desired vehicle parking section may be rotated to the ground level drive means comprising two electric motors 53 and 54 are provided at each side of the assembly 10. Adjacent the motor 53 (see FIGURE 8) a pulley double drum assembly 55 is provided which is driven by means of belt 56. The drums 55 are of a type so that a pair of cables 57 may be wound upon the respective drums 55 when the assembly is in rotational movement. The cables 57 extend around the periphery of the front ring 20 and back ring 22 from the drums 55 to a point approximately three-quarters of the circumference of the respective rings 20 and 22 where they are secured to the respective rings at 57a. These cables 57 are generally flat, metallic cables, such as is illustrated in FIGURE 4, which fit within a channel 58 provided by securing an annular bracket 59 of L cross section adjacent the periphery of rings 20 and 22. Thus it will be seen that when the motor 53 operates in a clockwise direction, as viewed in FIGURE 1, the cables 57 will be wound upon the drums 55 and the parking wheel 10 will revolve in a counterclockwise manner. While the motor 53 is operating in a counterclockwise manner another motor 54 is also activated and synchronized to run in the same direction and feed off a single cable 61. The motor 54 is provided with a single drum 60 and the single metal cable 61 which fits within a channel 58 on the middle ring 21. This metal cable 61 extends around the circumference of the ring 21 from the drum 60 approximately three-quarters of the circumference at which point it is also anchored to the ring similarly to the cables 57 at 61a. By having the respective mtors synchronized at the same speed the cables or cable will act as drags or a drag upon the other so the assembly 10 will not move unresisted in one direction. Further, by providing two cables on one side of the wheel and one on the other side greater stability is achieved as the wheel revolves, and the torque of the wheel is reduced if one quadrant of the wheel 10 should have more vehicles in it than the other quadrants.

When the desired vehicle parking section comes to the surface of the ground the respective motors 53 and 54 may be reversed to further break the rotation of the wheel 10 so that the desired section will stop and be aligned with the ground level.

As the wheel 10 rotates about its axis the various vehicle parking sections freely rotate upon the rollers 33 because they have a center of gravity lower than the diameter of the respective rings 30. This low center of gravity is caused by the platforms being less in width than the diameter of the vehicle rings 30 and further all the weight of the supports is below the empty platform. The center of gravity will remain below the diameter of the platforms even when loaded with vehicles because the engines of the respective vehicles will be lower than the diameter of the vehicle rings 30. Thus the platforms 43 will always remain horizontal and parallel to the ground surface, such as illustrated in FIGURE 1, no matter what transient location each vehicle parking section may be moved to within the wheel 10.

The vehicle parking wheel 10 is equipped with safety braking devices generally designated 63, as best seen in FIGURES 1 and 7. In the preferred embodiment of my invention four such braking devices are provided. They are positioned at the periphery of the respective rings 20 and 22, and adapted to engage the tracks 52 of the respective rings. Each ring 20, and 22 has two braking devices positioned on opposite generally diametric locations from each other and secured between the wheel assembly 10 and the cable drums 55 and 60.

The braking devices 63 each have a motor 64 mounted on a support 65 which is secured to the concrete floor. The motor 64 has a stub shaft 66 extending outward toward the wheel 10. Between the motor 64 and wheel 10 a brake rod support 67 is positioned. This support is provided with an opening 68 which in-line with the shaft 66. A slidable brake shoe rod 69 is mounted within the opening 68, and at the end of the rod 69 adjacent the wheel assembly 10 a brake shoe 70 is fitted to the rod 69.

The brake shoe 70 has a grooved front surface which is adapted to engage the track 52. Surrounding the rod 69 is a helically wound compression spring 71 having one end abutting the shoe 70 and the other end abutting the support 67. In this manner the spring 71 will constantly urge the shoe 70 outward toward engagement with the track 52.

The other end of the rod 69, remote from said shoe 70, is mounted within a swivel 72. Secured to the swivel 72 and stub shaft 66 is a centrifugal governor 73, of the well known type, having pivot arms 74 and two weights 75.

In operation when the motor 64 is activated the governor 73 will revolve and the centrifugal force of the weights 75 will cause them to move away from each other causing the rod 69 to move inward compressing the spring 71 and disengaging the shoe 70 from the track 52. When the power is off the compression spring 71 will force the shoe into engagement with the track 52, which pull the weights 75 toward each other.

The motors 64 are wired to synchronize, not shown, and will act in unison causing the brakes to engage and disengage simultaneously.

FIGURE 6 shows a modified form of the parking apparatus showing a lesser number of vehicle receiving sections for utilization in apartment houses or any small area where it is only necessary to have a unit with a 38 vehicle capacity.

In construction the wheel assembly 10' comprises two rings 20' and 21' mounted in a cavity 11' upon roller assemblies 17'.

The construction within each respective ring 20' and 21' comprises a plurality of hexagonal shaped weldments 70 which are made of steel I beams or the like and joined together so that the diametrical plane of the wheel 10' will always have a plurality of the weldments 80 aligned which can be brought to the ground level. Within the weldments 80 vehicle platforms 43' are freely rotatably mounted.

In operation when it is desired to obtain access to a particular vehicle parking section 29a the wheel assembly 10 is rotated on the rollers 49 in a clockwise or anti-clockwise manner depending upon the proximity of the section to the earth surface loading or unloading area. If the assembly 10 is to be rotated in an anti-clockwise manner the motor 53 is energized in a clockwise manner and the cable 57 will wind upon the drum 55, and with the other end of cable 57 secured to ring 21 at 57a the assembly will revolve about its horizontal axis. As the cable 57 is being wound upon the drum 55, motor 54 is energized in a clockwise manner allowing the cables 61 to be fed off of drums 60 and act as a drag on the assembly 10. When the section 29a reaches the surface of the earth the motors are stopped and the brake shoes 70 will engage the rings 20 and 22 and prevent further movement of the assembly 10 when the motors 53 and 54 are again energized and the brake shoes 70 are retracted.

While my preferred embodiment shows the parking wheel 10 mounted in a cavity of the earth, the wheel can be mounted on the surface of the earth in such a manner that by means of ramps and/or platforms adjacent the sides of the wheel 10 ingress and egress may be had to and from the vehicle parking sections 29a.

It should also be recognized that the parking apparatus installation is not limited to the out-of-doors but may be mounted within a building, and the wheel assembly 10 may be rotated so that any desired vehicle section 29a may be brought to a floor of the building having access to a street.

While the invention has been shown and described herein in what is conceived to be the most practical and preferred embodiment, it is recognized that departures may be made therefrom within the scope of the invention, which is therefore not to be limited to the details disclosed herein but is to be accorded the full scope of the claims and so as to embrace any and all equivalent apparatus.

Having described the invention, what is claimed as new and desired to be secured by Letters Patent is:

1. A vehicle parking apparatus comprising: a framework in the general form of a wheel having a central axis, the framework comprising annular external tracks, a plurality of spoke-like support means for each track positioned between said central axis and said tracks, and brace members rigidly interconnecting said tracks, a base element, rollers mounted on the base element rotatably receiving said tracks and rotatably supporting said wheel, a plurality of elongated vehicle platforms having safety fences, said platforms formed in said framework between said spoke-like supports, each platform extending longitudinally parallel to the axis of the wheel, means mounting each platform for individual free rotation in the framework on an axis parallel to the axis of the wheel and for maintaining the platform horizontal by action of gravity irrespective of its transient location in the orbit of the wheel and whether empty or loaded with a vehicle and each platform being openly accessible from at least one end for driving a vehicle on or off, a pair of oppositely acting motor means to rotate said framework in either one of two selected directions of rotation about the central axis, one of said pair of motor means being selectively operable at reduced energy in releasing action to afford a controllable braking force against the rotation force exerted by the opposite of said motor means.

2. A vehicle parking apparatus comprising: a framework in the general form of a wheel having a central axis, the framework comprising annular external tracks, a plurality of spoke-like support means for each track positioned between said central axis and said tracks, and brace members rigidly interconnecting said tracks, a base element, rollers mounted on the base element rotatably receiving said tracks and rotatably supporting said wheel, a plurality of elongated vehicle platforms having safety fences, said platforms formed in said framework between said spoke-like supports, each platform extending longitudinally parallel to the axis of the wheel, means mounting each platform for individual free rotation in the framework on an axis parallel to the axis of the wheel and for maintaining the platform horizontal by action of gravity irrespective of its transient location in the orbit of the wheel and whether empty or loaded with a vehicle and each platform being openly accessible from at least one end for driving a vehicle on or off, a pair of oppositely acting motor means to rotate said framework in either one of two selected directions of rotation about the central axis, one of said pair of motor means being selectively operable at reduced energy in releasing action to afford a controllable braking force against the rotation force exerted by the opposite of said motor means, wherein said motor means includes a pair of oppositely acting motors each diametrically mounted one from the other adjacent the circumference of said framework, a cable drum connected to each of said motors, a pair of cables passing in opposite directions around the circumference of said framework adjacent the external tracks from each of said drums to a generally common connection more than one half the circumference of said framework, and one of said motors and cables acting as a drag to resist free rotation of said framework as said other motor and cable rotates said framework.

References Cited in the file of this patent
UNITED STATES PATENTS

| | | |
|---|---|---|
| 1,431,930 | Campbell | Oct. 17, 1922 |
| 1,867,675 | McHenry et al. | July 19, 1932 |
| 2,297,199 | Buddecke | Sept. 29, 1942 |
| 2,689,658 | Youell | Sept. 21, 1954 |
| 2,706,054 | Morrison | Apr. 12, 1955 |

FOREIGN PATENTS

| | | |
|---|---|---|
| 483,753 | Italy | Aug. 11, 1953 |